United States Patent
Krause et al.

(10) Patent No.: US 6,708,804 B2
(45) Date of Patent: Mar. 23, 2004

(54) HYDRODYNAMIC TORQUE CONVERTER

(75) Inventors: Thorsten Krause, Bühl (DE); Bruno Müller, Bühl (DE)

(73) Assignee: Luk Lamellen und Kupplungsbau Beteiligungs KG, Buhl (DE)

(*) Notice: Subject to any disclaimer, the term of this patent is extended or adjusted under 35 U.S.C. 154(b) by 0 days.

(21) Appl. No.: 10/146,708

(22) Filed: May 14, 2002

(65) Prior Publication Data
US 2002/0195305 A1 Dec. 26, 2002

(30) Foreign Application Priority Data
May 15, 2001 (DE) .......................... 101 23 729

(51) Int. Cl.[7] .............................................. F16D 33/00
(52) U.S. Cl. .................................. 192/3.29; 192/113.32
(58) Field of Search .............................. 192/3.29, 3.3, 192/113.32

(56) References Cited

U.S. PATENT DOCUMENTS

| | | | |
|---|---|---|---|
| 4,382,496 A | * | 5/1983 | Yamamori et al. ......... 192/3.29 |
| 5,346,043 A | * | 9/1994 | Haka ......................... 192/3.29 |
| 5,613,582 A | | 3/1997 | Jackel |
| 5,662,194 A | | 9/1997 | Jackel |
| 5,690,200 A | | 11/1997 | Jackel |
| 5,738,198 A | | 4/1998 | Walth et al. |
| 5,769,196 A | * | 6/1998 | Murata ....................... 192/3.29 |

* cited by examiner

Primary Examiner—Saul Rodriguez
(74) Attorney, Agent, or Firm—Darby & Darby

(57) ABSTRACT

A hydrodynamic torque converter has a rotary housing which carries a pump assembly and can be driven by the output element of a prime mover in the power train of a motor vehicle, a turbine which is rotatable in the housing and has a hub mounted on the input shaft of a change-speed transmission, and a lockup clutch which, when engaged, can transmit torque from the housing directly to the turbine. The axially movable piston of the clutch is rotatable with the housing; this piston defines a first chamber with the housing and a second chamber with the turbine. The first chamber can receive pressurized hydraulic fluid to cause the piston to disengage the clutch so that the turbine can be rotated by the pump assembly by way of the body of fluid in the housing between the pump assembly and the turbine. The second chamber can receive fluid along at least one first path to engage the clutch by moving the piston toward the housing, and along at least one second path when the clutch is at least partially engaged.

18 Claims, 3 Drawing Sheets

HYDRODYNAMIC TORQUE CONVERTER

CROSS-REFERENCE TO RELATED CASES

This application claims the priority of the commonly owned copending German patent application Serial No. 101 23 729.4 filed May 15, 2001. The disclosure of the just mentioned German patent application, as well as that of each US and foreign patent and patent application identified in the specification of the present application, is incorporated herein by reference.

BACKGROUND OF THE INVENTION

This invention relates to improvements in hydrodynamic or hydrokinetic torque converters, for example, to torque converters which can be utilized in the power trains of motor vehicles.

A hydrodynamic torque converter which is utilized in the power train of a motor vehicle is installed between the rotary driving or output element or component of the prime mover (e.g., between the crankshaft or camshaft of an internal combustion engine or between the output element of a hybrid prime mover) and a rotary driven or input element or component, e.g., the input shaft of the change-speed transmission which can drive or which can be driven by one or more road-contacting wheels (for example, by way of a differential). The output element of the prime mover drives the rotary housing and the converter pump assembly (hereinafter called pump) of the torque converter, and the pump can drive the input shaft of the transmission.

A so-called bypass or lockup clutch (hereinafter called lockup clutch) is provided in many types of hydrodynamic torque converters to transmit torque directly between the output element of the engine (such as from the housing of the torque converter) and the input shaft of the transmission by way of at least one friction disc, such as a clutch disc. As a rule the housing further accommodates a stator which is installed between the pump and the turbine and can serve to improve the circulation of hydraulic fluid (such as oil) in the interior of the torque converter.

The lockup clutch employs a piston which shares the angular movements of the output element of the prime mover (i.e., of the housing and the pump of the hydraulic torque converter) and must be moved axially to engage (close) or disengage (open) the clutch. The means for moving the piston comprises two compartments or chambers (hereinafter called chambers) which flank the piston. One of the chambers is disposed between the piston and the housing (e.g., a wall which is or which can be resilient and is non-rotatably affixed to the output element of the prime mover), and the other chamber is disposed between the piston and the turbine of the torque converter.

When the torque converter in the power train of a motor vehicle is in actual use, it can develop dynamic pressures during engagement (closing) of the lockup clutch. The development of such dynamic pressures is attributable to the differences between the RPM of the piston of the lockup clutch and the RPM of the turbine of the torque converter; these stresses are highly undesirable because they oppose or are apt to oppose the optimal (most satisfactory) engagement (closing) of the lockup clutch.

OBJECTS OF THE INVENTION

An object of the present invention is to provide a hydrodynamic torque converter the operation of which during engagement and/or during disengagement of its lockup clutch (including the operation with slip) is more predictable and more satisfactory than that of conventional hydrodynamic torque converters.

Another object of our present invention is to provide a novel and improved hydrodynamic torque converter of the type embodying a lockup clutch.

A further object of the instant invention is to provide a novel and improved lockup clutch for use in hydrodynamic torque converters.

An additional object of the invention is to provide a novel and improved turbine for use in hydrodynamic torque converters, especially in torque converters which are installed in the power trains of automobiles or other types of motor vehcles.

Still another object of this invention is to provide a novel and improved method of controlling dynamic pressures during disengagement of the lockup clutch in a hydrodynamic torque converter.

A further object of the present invention is to provide a novel and improved method of and a novel and improved arrangement for controlling or regulating the flow of hydraulic fluid between as well as into and from the chambers which flank the axially movable piston of the lockup clutch in a hydrodynamic torque converter.

Another object of our invention is to provide a hydrodynamic torque converter wherein the pressure of fluid in the chamber between the piston of the lockup clutch and the turbine of the torque converter can be regulated (such as increased) with a much higher degree of predictability than in heretofore known torque converters.

A further object of the invention is to provide a hydrodynamic torque converter at least some component parts of which can be cooled more effectively and more predictably than in conventional hydrodynamic torque converters.

An additional object of this invention is to provide a novel and improved method of regulating the flow of hydraulic flid into one of the chambers of the torque converter during disengagement and/or in the disengaged condition of the lockup clutch, especially of regulating the flow of hydraulic fluid into the chamber between the piston of the lockup clutch and the turbine of the torque converter.

Still another object of the present invention is to provide a method of the above outlined character the practice of which does not necessitate resort to numerous, bulky, complex and/or expensive component parts in addition to or in lieu of those employed in conventional torque converters employing lockup clutches.

A further object of the instant invention is provide a power train, particularly for use in motor vehicles, which employs the above outlined torque converter.

SUMMARY OF THE INVENTION

One feature of the present invention resides in the provision of a hydrodynamic converter for transmission of torque between rotary driving and driven components. The improved torque converter comprises a rotary housing including a pump and serving to receive torque from the driving component, a rotary turbine which is disposed in the housing and is arranged to receive torque from the pump for transmission of torque to the driven component, and a lockup clutch which is provided in the housing and includes a piston rotatable with the driving component and defining a first chamber with the housing and a second chamber with the turbine. The clutch is disengageable in response to admission of a hydraulic fluid into the first chamber to move the piston toward the turbine, and the clutch is disengageable in response to admission of hydraulic fluid into the second chamber along a first path to move the piston toward the housing. The improved torque converter further comprises means for admitting into the second chamber a pressurized hydraulic fluid along at least one second path, and means for at least partially sealing the second path in the disengaged condition of the lockup clutch.

At least a portion of the second path can be defined by the turbine.

The turbine and the driven component are rotatable about a common axis, and the turbine can include a portion which extends at least substantially radially of and away from the common axis; the at least one second path can be provided in such portion of the turbine. The just mentioned portion of the turbine can include a collar and at least a portion of the at least one second path can be defined by at least one passage in the collar. Such passage can include a hole or bore which is at least substantially and/or at least partially parallel to the common axis.

The turbine can further include a hub which surrounds the driven component, and the aforementioned collar can surround the hub. The at least one second path can be provided in the collar adjacent the hub. The sealing means can comprise a closure for the at least one second path; such closure can surround the hub between the piston and the collar and can be arranged to at least partially seal the at least one second path in response to engagement of the lockup clutch. The closure can include or constitute an annular member which is movable axially of the hub between the piston and the collar.

The driving component can include a rotary disc-shaped member which is of one piece with or is affixed to the housing, and the driven component can include a rotary shaft, e.g., the input shaft of the change-speed transmission in the power train of the motor vehicle.

The torque converter can further comprise a torsional vibration damper which operates between the piston and the driven component, and a stator which is provided in the housing intermediate the pump and the turbine.

The turbine and the housing are or can be rotatable about a common axis, and one of the two chambers can be nearer to the common axis than the other chamber.

The piston and the housing can define a passage for the flow of fluid from the first chamber into the second chamber in the disengaged condition of the lockup clutch. Furthermore, the piston and the housing can define a passage for the flow of hydraulic fluid from the second chamber into the first chamber in the engaged condition of the lockup clutch.

The piston can be provided with friction linings which are engageable with the housing and/or with another rotary part of the torque converter at least in the engaged condition of the lockup clutch.

Another feature of the present invention resides in the provision of a method of operating a hydrodynamic torque converter which is or which can be provided in the power train of a motor vehicle and includes a rotary housing having a pump and being arranged to receive torque from a driving component of the prime mover in the power train, a rotary turbine disposed in the housing and arranged to receive torque from the pump for transmission of torque to a driven component of the power train, and a lockup clutch provided in the housing and having a piston rotatable with the driving component and movable in the housing toward and away from the turbine intermediate first and second chambers to disengage the clutch in response to admission, of pressurized hydraulic fluid into one of the chambers and to engage the clutch in response to admission of pressurized hydraulic fluid into the other chamber. The improved method comprises the steps of admitting into the one chamber a hydraulic fluid at a pressure higher than the pressure then prevailing in the other chamber to thus move the piston toward the turbine with attendant reduction of the volume of the other chamber, introducing into the other chamber a hydraulic fluid at a pressure higher than the pressure then prevailing in the one chamber to thus move the piston away from the turbine and to reduce the volume of the one chamber, and simultaneously conveying into the other chamber a hydraulic fluid through at least one passage provided in the turbine and communicating with the other chamber only in the course of the introducing step.

At least one of the aforementioned steps can include conveying hydraulic fluid through and/or along the driven component.

The novel features which are considered as characteristic of the invention are set forth in particular in the appended claims. The improved torque converter itself, however, both as to its construction and the modes of assembling, installing and operating the same, together with numerous additional important features and attributes thereof, will be best understood upon perusal of the following detailed description of certain presently preferred specific embodiments with reference to the accompanying drawing.

DESCRIPTION OF PREFERRED EMBODIMENTS

Figure 1:
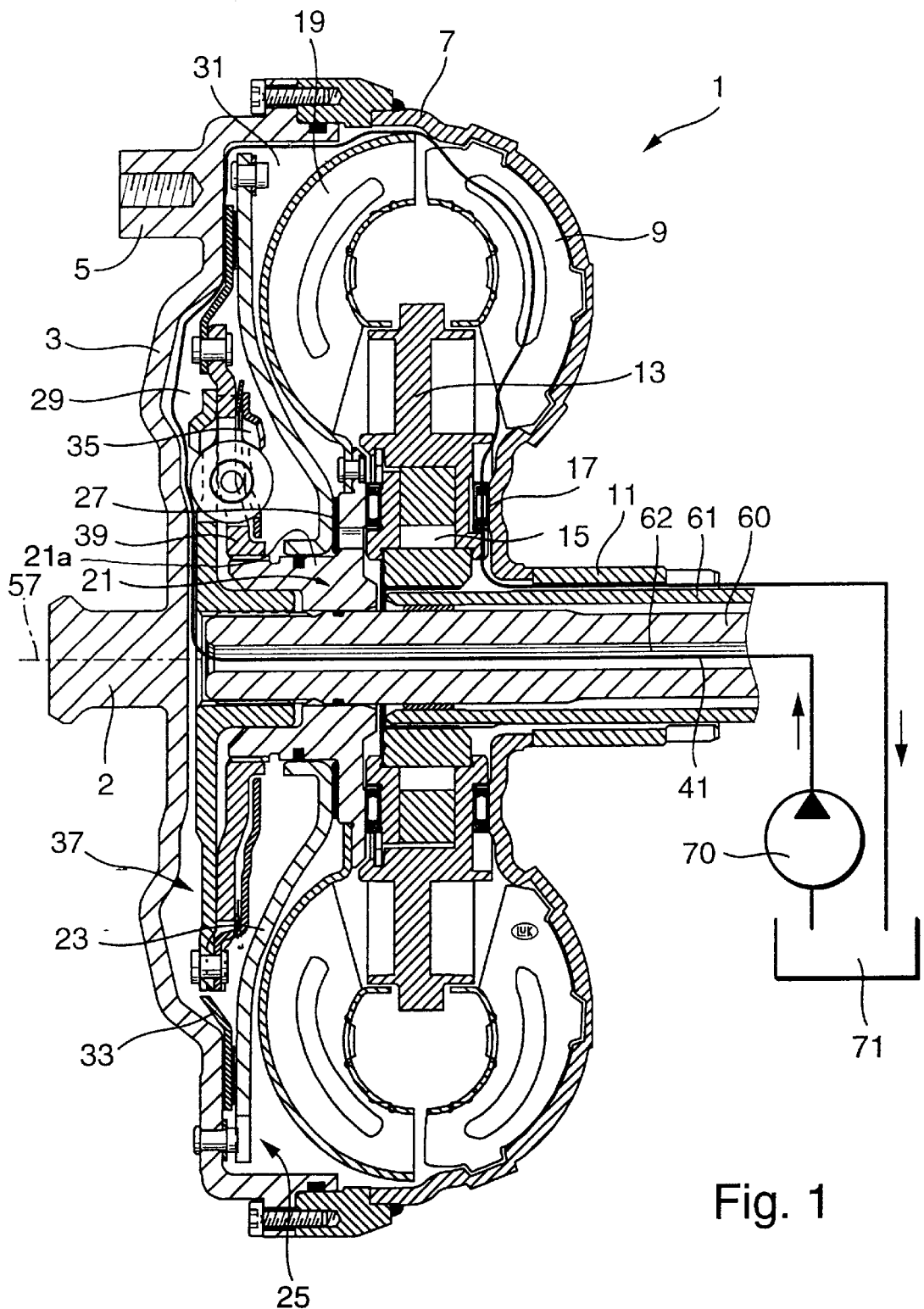
FIG. 1 is a somewhat schematic axial sectional view of a hydrodynamic torque converter which embodies one form of the present invention, the lockup clutch of the converter being shown in the disengaged condition.
Figure 2:
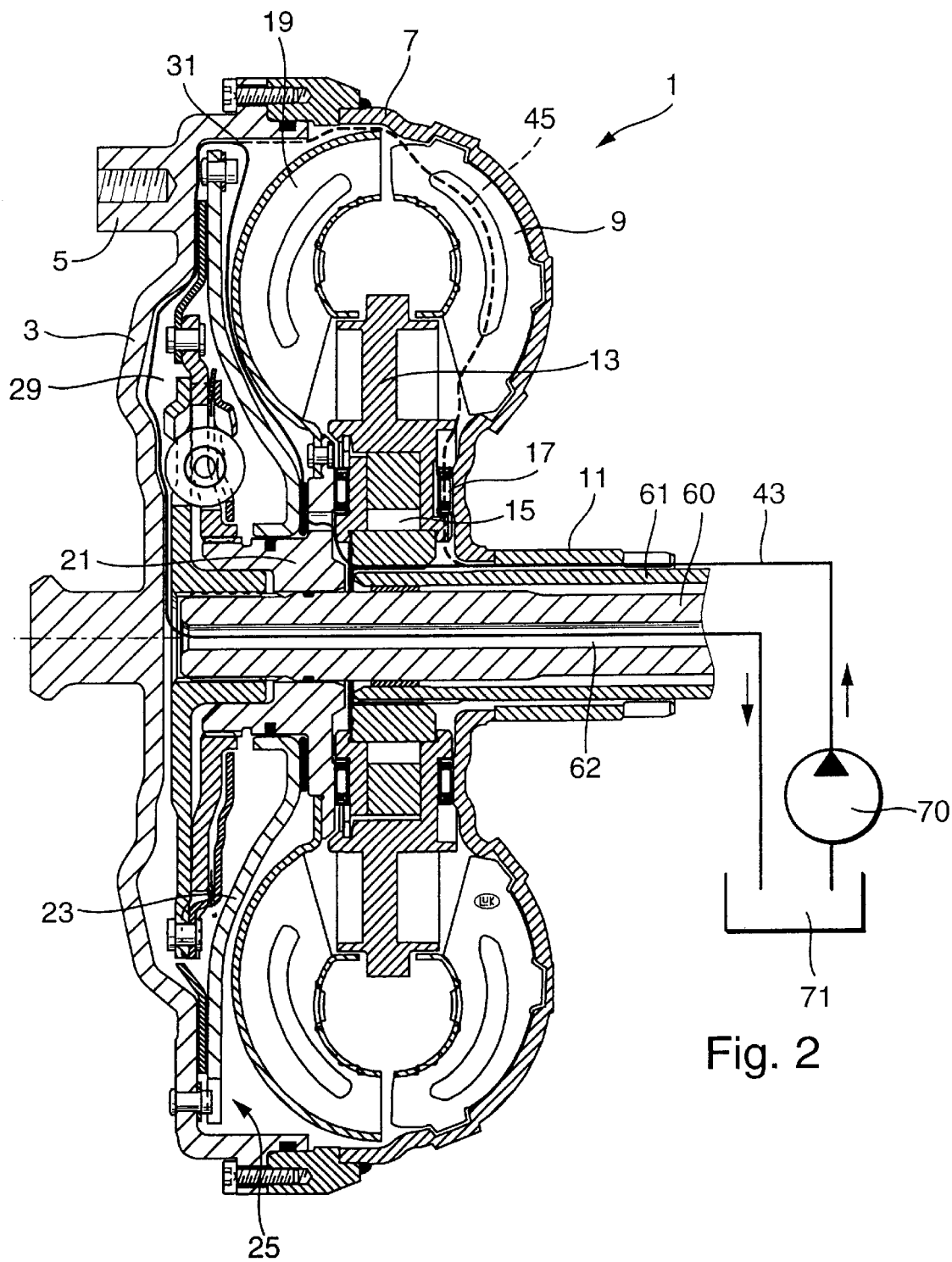
FIG. 2 illustrates the structure of FIG. 1 but with the lockup clutch in the engaged condition.

FIGS. 1 and 2 illustrate a hydrodynamic torque converter 1 which embodies one form of the present invention. This torque converter comprises a bypass clutch or lockup clutch 25 which is open or disengaged in FIG. 1 and closed or engaged in FIG. 2. The torque converter 1 further comprises a rotary disc-shaped driving component 3 which can receive torque from a suitable prime mover, e.g., from the crankshaft or camshaft 2 of an internal combustion engine in the power train of a motor vehicle. Reference may be had, for example, to commonly owned U.S. Pat. No. 5,738,198 granted Apr. 14, 1998 to Walth et al. for "FRICTION ELEMENT FOR USE IN CLUTCHES".

The component 3 forms part of or is welded and/or otherwise affixed to a housing or cover 7 and carries a starter gear 5 which is affixed thereto by a set of mating gear teeth, by welding, by caulking, by shrinking and/or in any other suitable manner. The component 3 and its gear 5 can further carry an annular or otherwise distributed array of indicia for regulation of the driving unit. The radially outermost portion of the component 3 is affixed to or forms part of the housing 7 which is form-lockingly connected with the converter pump assembly 9 (hereinafter called pump). The housing 7 and the pump 9 constitute the input part of the torque converter 1.

The housing 7 or the pump 9 includes a sleeve-like axial extension 11 (also called neck) which surrounds the input shaft 60 or an axially extending tubular part of the case or housing of the change-speed transmission in the power train of the motor vehicle. The extension or neck 11 carries a stator 13 and a freewheel (overrunning clutch) assembly 15. The pump 9 is rotatable relative to the stator 13. The character 17 denotes a thrust bearing which is interposed between the stator 13 and the pump 9.

The internal vanes or blades of the pump 9 cooperate with the vanes of a rotary turbine 19 which is installed in the housing 7 and is rotatable with a hub 21. The latter is non-rotatably but preferably axially movably mounted on the aforementioned input shaft 60 of the change-speed transmission.

The lockup clutch 25 comprises a piston 23 which is axially movably mounted on an axial extension 21a of the hub 21. The radially outermost portion of the piston 23 is movable axially of the torque converter 1 and is non-rotatably coupled to the driving component 3, e.g., by means of leaf springs (not shown). A disc-shaped annular supporting member 27 (see also FIG. 3) rotatably mounts the piston 23 on the hub 21 of the turbine 19.

The piston 23 divides the interior of the housing 7 into two annular chambers or compartments 29 and 31 which are at least substantially sealed from each other when the lockup clutch 25 is at least partially engaged. This piston is rotatable relative to the hub 21 of the turbine 19.

For example, the chamber 31 can receive a pressurized hydraulic fluid (e.g., oil) by way of a passage between the extension 11 of the housing 7 and a tubular portion or extension 61 of the transmission case. The other chamber 29 can discharge hydraulic fluid by way of an axial passage 62 provided in the input shaft 60 of the change-speed transmission and discharging into an outlet between the input shaft and the tubular extension or portion 61 of the transmission case. The input shaft 60 is rotatable in the extension 61 by way of a friction bearing (not shown) which further serves as a means for sealing the outlet of the chamber 29 from the chamber 31.

When the lockup clutch 25 is operative, i.e., when it transmits torque with or without slip, the engine-driven component 3 transmits torque to the input shaft 60 of the change-speed transmission by way of at least one friction-generating lamination 33 the radially outermost portion of which carries friction linings at each of its sides. One set of such friction linings then contacts the friction surface at the inner side of the component 3 and the other set of friction linings then contacts the piston 23. The lamination 33 is non-rotatably but (if necessary) axially movably connected with the input member 35 of a torsional vibration damper 37 which further includes an output member 39 non-rotatably but (if necessary) axially movably affixed to to the hub 21 and/or to another part of the turbine 19.

The lockup clutch 25 becomes operative when the pressure of hydraulic fluid in the chamber 31 rises relative to the pressure in the chamber 29. Such rise of fluid pressure in the chamber 31 causes the piston 23 of the clutch 25 to move axially and to thus cause the lamination 33 to receive torque from the component 3 by way of the piston 23, i.e., the housing 7 and the component 3 can transmit torque to the input shaft 60 of the change-speed transmission. If the pressure of fluid in the chamber 29 thereupon rises relative to that in the chamber 31, the frictional engagement between the lamination 33 on the one hand and the component 3 on the other hand decreases or is terminated so that the lockup clutch 25 is disengaged and the input shaft 60 of the transmission receives torque from the component 3 via housing 7, pump 9, the body of hydraulic fluid in the housing, turbine 19 and hub 21. Such transmission of torque also takes place by way of the torsional vibration damper 37.

As already mentioned hereinbefore, FIG. 1 shows the lockup clutch 25 in the disengaged condition. The flow of hydraulic fluid is indicated by the arrow next to the solid line 41, i.e., such fluid flows from a source 71, through a pump 70, axially through the passage 62 of the input shaft 60 (which is connected with the damper 37), radially outwardly past the damper 37, into the chamber 29 and thence into the chamber 31. The latter is free to discharge fluid into the source 71. As the volume of fluid in the chamber 29 increases, such fluid causes the piston 23 of the lockup clutch 25 to move axially and away from the component 3. The turbine 19 causes a simultaneous drop of fluid pressure in the chamber 31.

The arrows next to the solid line 43 in FIG. 2 indicate the direction of flow of hydraulic fluid during closing (i.e., engagement) of the lockup clutch 25. A broken line 45 indicates the flow of fluid in a manner as in conventional hydrodynamic torque converters, i.e., through the pump 9 and into the chamber 31. In addition, hydraulic fluid can flow through the interior of the hollow hub 21 and thence between the piston 23 and the turbine 19 into the chamber 31. The fluid in this chamber causes the piston 23 of the lockup clutch 25 to move axially toward the component 3. The chamber 29 permits evacuation of fluid during engagement of the lockup clutch 25, i.e., while the piston 23 is still free to turn (slip) relative to the component 3 and housing 7.

Figure 3:
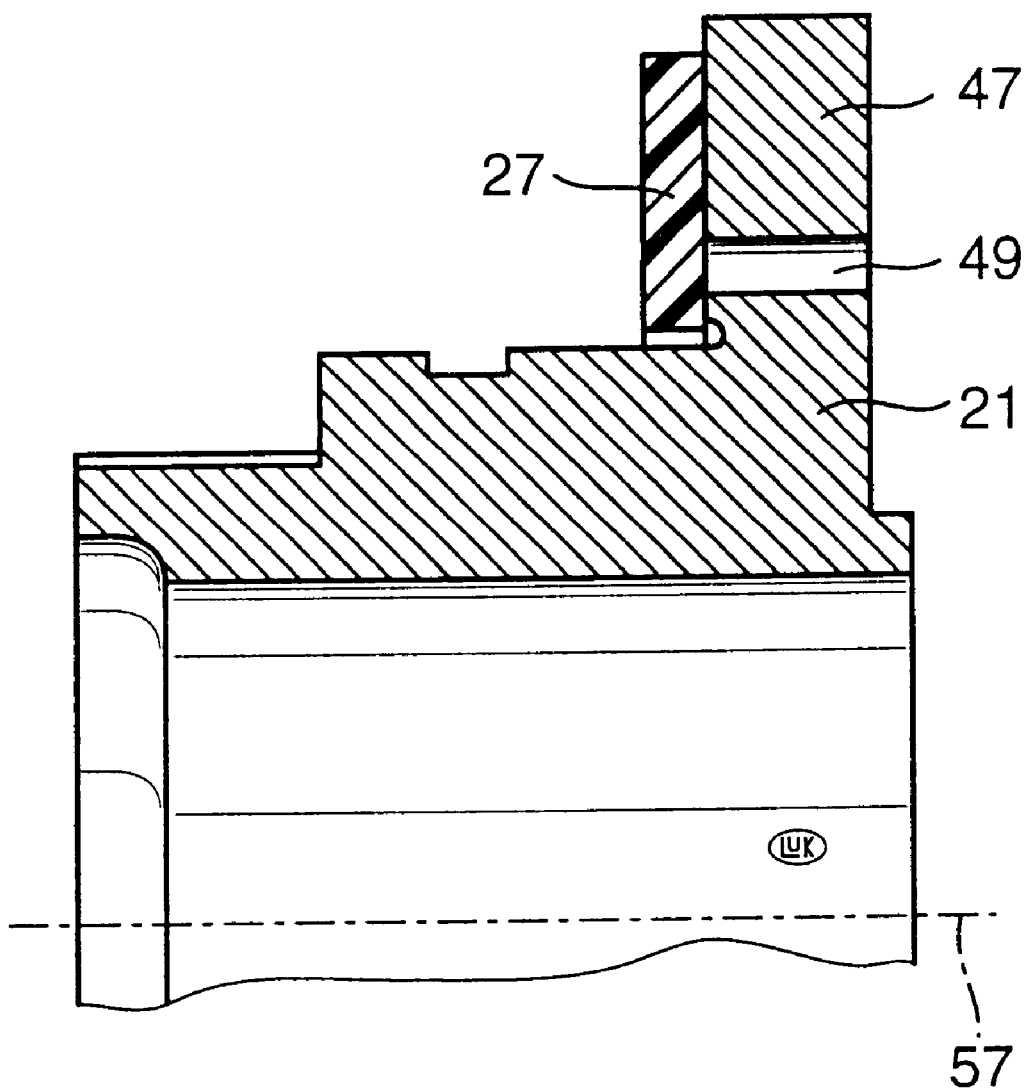
FIG. 3 is an enlarged view of a detail in the hydrodynamic torque converter of FIGS. 1 and 2.

FIG. 3 shows a passage or opening 49 (e.g., a hole) or one of two or more bypass openings provided in a radially outwardly extending portion or collar 47 forming part of the hub 21 for the turbine 19. One end of the illustrated opening 49 is overlapped by the aforementioned disc 27; this opening is shown in the form of a straight bore or hole having an axis which is or which can be parallel to the common axis 57 of the housing 7, pump 9 and turbine 19.

An opening (24) in the flange (25) of a turbine (8) in a hydrodynamic torque converter is shown in FIG. 1 of commonly owned U.S. Pat. No. 5,613,582 granted Mar. 25, 1997 to Jäckel. However, the hole 24 is not provided for the purposes correspondig to those of the hole 49 shown in FIGS. 1 to 3 of the present application and does not cooperate with a disc-shaped closure 27 in a manner to be fully described hereinafter regarding the operation of our improved hydrodynamic torque converter. Furthermore, holes corresponding to that shown at 24 in FIG. 1 of the patent to Jäckel are also shown in commonly owned U.S. Pat. Nos. 5,662,194 and 5,690,200.

The purpose of the opening 49 in the flange 47 of the hub 21 forming part of or associated with the turbine 19 in the hydrodynamic torque converter 1 of the present invention is to influence, in a novel manner and under predetermined circumstances, the flow of hydraulic fluid between the hub 21 for the turbine 19 and the piston 23, namely to reduce the pressure drop which develops as a result of difference between the rotational speeds of the turbine and the piston 23 by promoting the buildup of fluid pressure in the chamber 31 in response to closing of the lockup clutch 25. When the lockup clutch 25 is disengaged (see FIG. 1), the disc 27 prevents the flow of hydraulic fluid through the opening 49 in that it bears upon the adjacent side of the flange 47.

The feature that the disc 27 seals one end of the opening 49 in the disengaged condition of the lockup clutch 25 ensures that, when the torque converter 1 is operated in the normal way, namely when the flow of fluid from the pump 70 into the chamber 29 takes place in the conventional manner (as shown in FIG. 1), the fluid circulates in a manner as illustrated by the arrows adjacent the path indicated by the solid line 41, i.e., it flows almost exclusively through the toroidal space between the pump 9 and the turbine 19. This ensures a more satisfactory cooling of at least some component parts of the improved torque converter.

An advantage of the improved torque converter is that the at least one passage 49 permits for controlled admission of pressurized hydraulic fluid into the chamber 31, i.e., this passage enables the torque converter to influence or correct the fluid pressure in the chamber 31. Such influencing ensures that one can control (particularly reduce) undesirable (such as excessive or insufficient) pressure differentials between the fluids which are confined in the chambers 29 and 31. This, in turn, ensures that the lockup clutch 25 can be engaged and/or disengaged in a predictable manner and with a degree of accuracy and reproducibility much higher than that achievable with presently known torque converters.

In order to disengage the lockup clutch 25, the pressure of hydraulic fluid in the chamber 29 is increased to a value which is necessary to move the piston 23 axially toward the turbine 19. The fluid which then flows from the second chamber 31 serves to ensure at least partial replenishment of the supply of fluid in the toroidal space between the pump 9 and the turbine 19. When the clutch 25 is fully disengaged, the transmission of torque from the driving component 2 to the driven component 60 takes place exclusively by way of the housing 7, pump 9, the body of fluid between the pump 9 and the turbine 19, and turbine 19. This can entail a pronounced heating of fluid in the toroidal space between the pump 9 and the turbine 19. The aforediscussed replenishment of the supply of fluid in the toroidal space prevents an overheating of fluid, i.e., the fluid flowing into the toroidal space exchanges heat with the fluid in such space.

The feature that the passage 49 is at least substantially sealed in the disengaged condition of the clutch 25 prevents the establishment of an excessive bypass which could entail an excessive reduction of fluid circulation (i.e., an excessive fluid exchange) within the toroidal space between the pump 9 and the turbine 19.

The placing of the passage(s) 49 in the collar 47 close to the hub 21 (i.e., close to the axis 57) also contributes to a more satisfactory flow of fluid to the chamber 31 and into the toroidal space between the pump 9 and the turbine 19. The collar 47 of the turbine 19 and the disc-shaped closure 27 together constitute a valve which closes automatically when the lockup clutch 25 is engaged.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art of hydrodynamic torque converters and, therefore, such adaptations should and are intended to be comprehended within the meaning and range of equivalence of the appended claims.

What is claimed is:

1. A hydrodynamic converter for transmission of torque between rotary driving and driven components, comprising:
   a rotary housing including a pump and arranged to receive torque from said driving component;
   a rotary turbine disposed in said housing and arranged to receive torque from said pump for transmission of torque to said driven component;
   a lockup clutch provided in said housing and including a piston rotatable with said driving component and defining a first chamber with said housing and a second chamber with said turbine, said clutch being disengageable in response to admission of a pressurized hydraulic fluid into said first chamber to move said piston toward said turbine and said clutch being disengageable in response to admission of hydraulic fluid into said second chamber along a first path to move said piston toward said housing;
   means for admitting into said second chamber the pressurized hydraulic fluid along at least one second path; and
   means for at least partially sealing said second path in a disengaged condition of the clutch, wherein at least one passage is provided in the turbine and in communication with one of the chambers when the hydraulic fluid is introduced into the one chamber and wherein when the clutch is in a disengaged position, the passage is closed and a connection exists between the first chamber and the second chamber on either side of the clutch.

2. The converter of claim 1, wherein said second path is provided, at least in part in part, in said turbine.

3. The converter of claim 1, wherein said turbine is rotatable with said driven component about a common axis and includes a portion extending at least substantially radially of and away from said axis, said at least one second path being provided in said portion of said turbine.

4. The converter of claim 3, wherein said portion of said turbine includes a collar and said at least one second path is defined by at least one passage in said collar.

5. The converter of claim 4, wherein said at least one passage includes a hole which is at least substantially parallel to said axis.

6. The converter of claim 3, wherein said turbine further includes a hub surrounding said driven component, said portion of said turbine including a collar surrounding said hub and said at least one second path being provided in said collar adjacent said hub.

7. The converter of claim 6, wherein said sealing means comprises a closure for said at least one second path, said closure surrounding said hub between said piston and said collar and being arranged to at least partially seal said at least one second path in response to engagement of said lockup clutch.

8. The converter of claim 7, wherein said closure includes an annular member and is movable axially of said hub between said piston and said collar.

9. The converter of claim 1, wherein said driving component includes a rotarty disc-shaped member and said driven component includes a rotary shaft.

10. The converter of claim 1, further comprising a torsional vibration damper between said piston and said driven component.

11. The converter of claim 1, further comprising a stator provided in said housing intermediate said pump and said turbine.

12. The converter of claim 1, wherein said turbine and said housing are rotatable about a common axis and one of said chambers is nearer to said axis than the other of said chambers.

13. The converter of claim 1, wherein said piston and said housing define a passage for the flow of fluid from said first chamber into said second chamber into said second chamber in the disengaged condition of said clutch.

14. The converter of claim 1, wherein said piston and said housing define a passage for the flow of hydraulic fluid from said second chamber into said first chamber in the engaged condition of said clutch.

15. The converter of claim 1, wherein said piston has friction linings engageable with said housing in the engaged condition of said clutch.

16. A method of operating a hydrodynamic torque converter which is provided in the power train of a motor vehicle and includes a rotary housing having a pump and being arranged to receive torque from a driving component of a prime mover in the power train, a rotary turbine disposed in the housing and arranged to receive torque from the pump for transmission of torque to a driven component of the power train, and a lockup clutch provided in the housing and having a piston rotatable with the driving component and movable in the housing toward and away from the turbine intermediate first and second chambers to disengage the clutch in response to admission of pressurized hydraulic fluid into one of the chambers and to engage the clutch in response to admission of pressurized hydraulic fluid into the other chamber, comprising the steps of:

admitting into the one chamber a hydraulic fluid at a pressure higher than the pressure then prevailing in the other chamber to thus move the piston toward the turbine with attendant reduction of the volume of the other chamber;

introducing into the other chamber a hydraulic fluid at a pressure higher than the pressure then prevailing in the one chamber to thus move the piston away from the turbine and to reduce the volume of the one chamber; and simultaneously conveying into the other chamber the hydraulic fluid through at least one passage provided in the turbine and communicating with the other chamber only in the course of said introducing step, wherein when the clutch is in a disengaged condition, the at least one passage is closed and a connection exists between the one chamber and the other chamber on either side of the clutch.

17. The method of claim 16, wherein at least one of said steps includes conveying hydraulic fluid through the driven component.

18. The method of claim 16, wherein at least one of said steps includes conveying hydraulic fluid along the driven component.

* * * * *